UNITED STATES PATENT OFFICE.

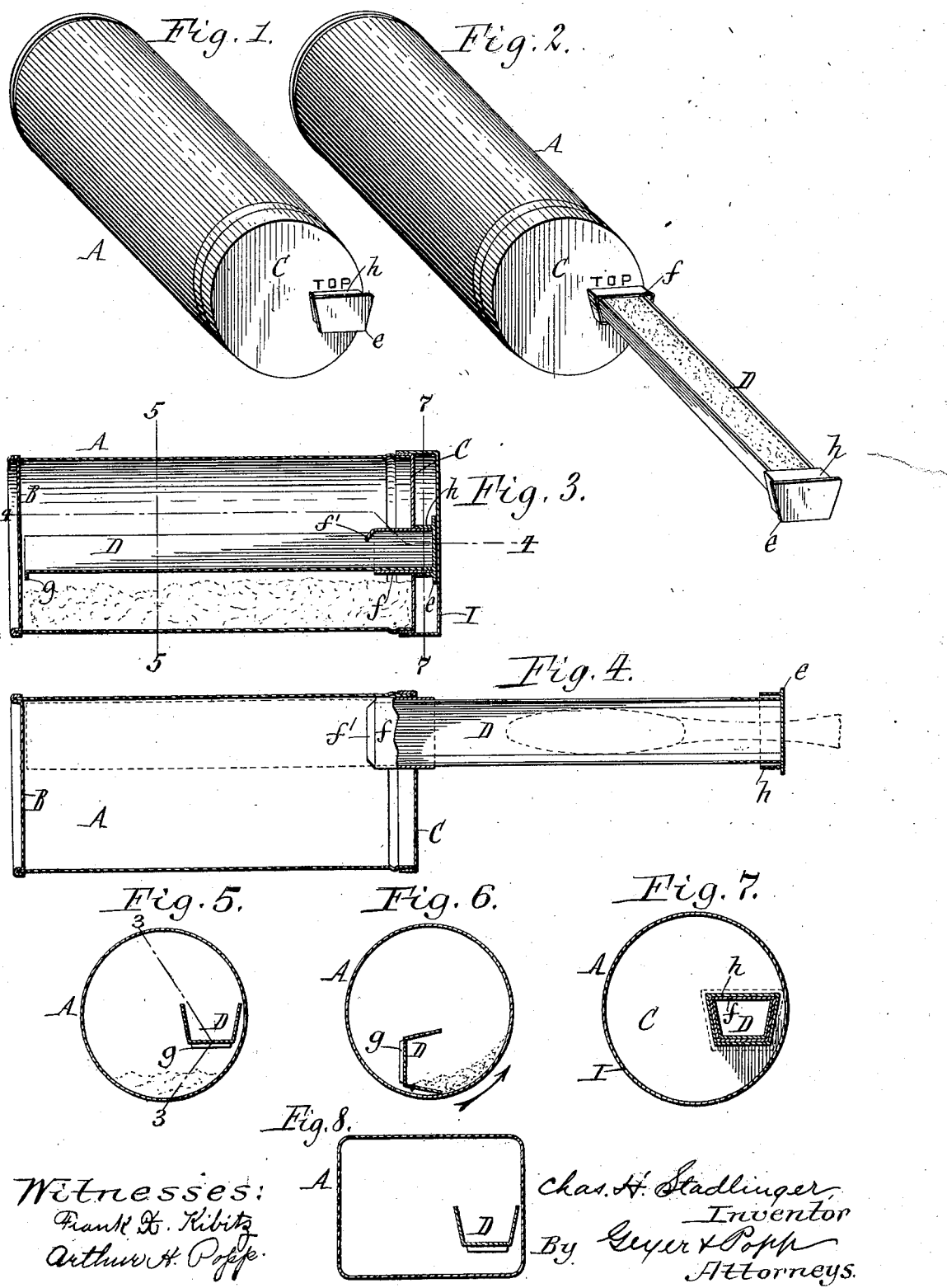

CHARLES H. STADLINGER, OF BUFFALO, NEW YORK.

TOOTH-POWDER BOX.

SPECIFICATION forming part of Letters Patent No. 678,056, dated July 9, 1901.

Application filed March 25, 1901. Serial No. 52,810. (No model.)

*To all whom it may concern:*

Be it known that I, CHARLES H. STADLINGER, a citizen of the United States, and a resident of Buffalo, in the county of Erie and State of New York, have invented a new and useful Improvement in Tooth-Powder Boxes, of which the following is a specification.

This invention relates to the class of boxes which are employed principally as receptacles for tooth-powder. Among other delivery devices such boxes have been provided with a movable trough or tray which is designed to receive a charge of powder from the box and into which a tooth-brush may be dipped.

The objects of my invention are to combine a sliding trough with the powder-box in such manner that the last portion of its contents can be conveniently delivered into the trough and utilized, without the use of separate gathering devices, and so that the use of such a trough requires no departure from the conventional tin powder-boxes of cylindrical or rectangular form with flat ends, thus providing a box which can be stacked and packed in quantities in as small a space and shipped at as low a rate as such ordinary boxes.

My invention has the further object to provide such boxes with a simple and improved device for preventing spilling of the powder over the top of the delivery-trough in withdrawing and returning the latter.

In the accompanying drawings, Figure 1 is a perspective view of a cylindrical box containing my invention, the trough being fully pushed into the box and the cap or outer cover removed. Fig. 2 is a similar view showing the trough withdrawn. Fig. 3 is a longitudinal section of the box in line 3 3, Fig. 5. Fig. 4 is a longitudinal section in line 4 4, Fig. 3, with the trough withdrawn. Fig. 5 is a cross-section in line 5 5, Fig. 3. Fig. 6 is a similar section showing the box turned into the position for scooping the final portion of its contents into the trough. Fig. 7 is a cross-section in line 7 7, Fig. 3. Fig. 8 is a cross-section of a rectangular box embodying my invention.

Like letters of reference refer to like parts in the several figures.

A is the body of the box, which in the construction shown in Figs. 1 to 7 is cylindrical, and B is its flat bottom.

C is the flat cover of the box, having the usual rim, which fits over the end thereof.

D is a powder tray or trough, of tin or other suitable material, arranged to slide lengthwise in the box and extending through an opening formed in one of its flat ends, preferably in the cover C. This trough may be of any desired form; but it preferably has a flat bottom and upwardly-flaring side walls, as shown. The trough is made of sufficient length and width to receive the entire surface of a toothbrush, so that the brush may be dipped into the trough and coated with powder over its entire area. In the preferred construction shown in the drawings the trough extends throughout the length of the box, and its front end projects a short distance beyond the cover. The head which closes the front end of the trough projects beyond the top, bottom, and sides thereof to form a marginal rim $e$ for conveniently withdrawing the trough. As shown in the drawings, the trough is offset from the center of the box and its outer wall is arranged in close proximity to the wall of the box. The bottom of the trough is arranged at a distance from the opposing wall of the box, so as to leave an intervening space which permits the powder to fall away from the bottom of the trough. This prevents the powder from adhering in any considerable quantity to the bottom of the trough and avoids scattering and waste of the powder, which is liable to occur when the trough-bottom is located closely to the wall of the box. To facilitate the insertion of the trough, its inner end is preferably open, so that its bottom and side walls readily cut through the mass of powder in the box.

The cover C of the box is provided around the edge of its opening with a guide-collar $f$, which extends a short distance beyond the inner and outer sides of the cover, so as to guide and steady the trough in its movements. The portion of the guide-collar $f$ which bridges the open side of the trough is provided at its rear edge with a scraper or skimming-lip $f'$, which skims off the surplus powder deposited in the trough, thereby preventing the powder from spilling over the edges of the trough upon withdrawing the latter. When the withdrawn trough is pushed into the box, the resistance of the mass of powder in the box causes the powder in the rear portion of the trough to be crowded or displaced forwardly, banking or heaping the same above the upper edges of the trough adjacent to the guide-collar $f$, and during the last portion of the closing movement of the trough this banked mass of powder is partly spilled in the absence of any provision for preventing this objection. To obviate such spilling, the skimming-lip $f'$ is located inside of the box near the head through which the trough passes and is arranged to extend a short distance into the trough, as shown in Fig. 3, so as to form a furrow in the mass of powder in the trough upon withdrawing the latter. By thus leveling the powder below the top of the trough sufficient space is left in the upper portion of the trough to receive the powder crowded forward in the same when the trough is closed, as above described, thereby making room for such displaced powder and preventing spilling of the same. The trough is provided at the rear end of its bottom with a stop or lip $g$, adapted to strike the inner end of the guide-collar $f$ for preventing the entire withdrawal of the trough from the opening of the cover. The trough is provided on the inner side of its head with an inwardly-extending cap or shield $h$, which extends around the top, bottom, and sides of the trough and which is constructed to overlap the portion of the guide-collar $f$ located on the outer side of the cover, thereby forming a seal or closure at this point, which retains the perfume of the powder when the box is not in use. The shield $h$ is secured to the rear side of the trough-head and separated from the trough by a space of sufficient width to receive the outer end of the guide-collar $f$, as shown in Figs. 3, 4, and 7. A cap or supplemental cover $I$ is preferably placed over the main cover $C$ of the box to conceal the outer end of the trough $D$ and give the box a more finished appearance.

When the box is so full that the trough is buried in the mass of powder and it is desired to cleanse the teeth, it is only necessary to hold the box in a horizontal position, with the open side of the trough upward, and then withdraw the trough and dip the brush into the same, as shown in Fig. 4. When the contents of the box have been consumed to such an extent that the trough is no longer submerged in the powder, the box while being held in a horizontal position is turned in the proper direction to cause the powder to fall into the trough, and the latter is then withdrawn, with its open side upward.

By locating the trough next to the wall of the box, as shown, the last portion of the contents of the box cannot escape between the trough and the box and constantly fall back under the trough, as is the case when the trough is remote from the wall of the box, but the powder is caught and scooped up by the trough as it flows or falls toward that portion of the box which for the time being forms its bottom, as shown in Fig. 6. All of the powder is thus deposited in the trough and the entire contents of the box are utilized. This result is accomplished without the use of a separate gathering device—such, for instance, as an internal hopper, which reduces the capacity of the box and increases its cost—and without making one end of the box conical or funnel-shaped or otherwise departing from the usual flat-ended form of such boxes. Boxes of my improved construction can therefore be piled or stacked for display, like ordinary cylindrical or rectangular boxes with flat ends, and can be packed in as small a compass and as cheaply shipped as such boxes. As the trough D and its guide $f$ do not project to any material extent in the normal condition of the box, these parts are not liable to be bent, broken, or otherwise damaged in transit and rendered unserviceable.

My improved arrangement of the delivery-trough also permits the use of a comparatively wide, long, and deep trough, which holds a sufficient charge of powder for a number of dips of the brush and an entire brushing of the teeth and into which the whole surface of the brush can be dipped, thereby applying powder to the side and end bristles as well as the middle bristles of the brush, bringing the powder in contact with the portions of the teeth adjacent to the gums and insuring a thorough cleansing of the same.

Another important advantage of my improvement is that the powder deposited in the trough is distributed throughout its length and not in one portion thereof, as is the case in boxes having a conoidal or funnel-shaped end for gathering the powder around the trough. A tooth-brush dipped into the trough of my improved box therefore becomes coated with powder over its entire area.

My improvement is applicable to rectangular and other flat-sided boxes, as well as cylindrical or oval boxes, Fig. 8 showing the improvement in connection with a rectangular box. If desired, the projecting outer portion of the guide-collar $f$ may be provided with a suitable guide-mark or designation, as the word "Top," as shown, to indicate the upper side of the delivery-trough.

I am aware that prior to my invention tooth-powder boxes have been provided with a sliding delivery-trough and a funnel-shaped head for gathering the powder into the trough. I am also aware that powder-boxes with such sliding troughs have been provided with sloping or hopper-shaped bottoms for the same purpose, and I do not therefore wish to claim either of such constructions.

I claim as my invention—

1. A powder-box containing a sliding delivery-trough which extends through one of its ends and which is located on one side of the center thereof, the outer wall of the trough being arranged parallel with and in close proximity to the wall of the box, and its opposite wall being separated from the opposing wall of the box, whereby when the level of the box contents falls below the top of the trough, the latter can be filled only by rotating the box, substantially as set forth.

2. A powder-box containing a sliding delivery-trough extending through one of its ends and located on one side of its center, the outer wall of the trough being arranged parallel with and in close proximity to the wall of the box, and its opposite wall and its top and bottom being separated from the wall of the box, substantially as set forth.

3. A powder-box having an internal, sliding delivery-trough which extends through one of the heads thereof, and a skimmer arranged within the box, near said head, and extending into the open side of the delivery-trough, substantially as set forth.

4. A powder-box having an internal, sliding delivery-trough which extends through an opening in one of the heads of the box, and a guide-collar arranged around the edge of said opening and extending into the box a short distance beyond the adjacent box-head and provided at its rear end with a skimming-lip which extends into the open side of the delivery-trough, substantially as set forth.

Witness my hand this 19th day of March, 1901.

CHARLES H. STADLINGER.

Witnesses:
 CARL F. GEYER,
 THEO. L. POPP.